(12) United States Patent
Kamisawa et al.

(10) Patent No.: US 8,419,966 B2
(45) Date of Patent: Apr. 16, 2013

(54) METHOD OF MANUFACTURING HEXAGONAL FERRITE MAGNETIC POWDER, MAGNETIC RECORDING MEDIUM AND METHOD OF MANUFACTURING THE SAME

(75) Inventors: Shiho Kamisawa, Odawara (JP); Toshio Tada, Odawara (JP); Nobuo Yamazaki, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 249 days.

(21) Appl. No.: 12/750,225

(22) Filed: Mar. 30, 2010

(65) Prior Publication Data
US 2010/0246063 A1 Sep. 30, 2010

(30) Foreign Application Priority Data

Mar. 31, 2009 (JP) .................... 2009-086560

(51) Int. Cl.
*C04B 35/26* (2006.01)
*C04B 35/64* (2006.01)

(52) U.S. Cl.
USPC ............ 252/62.56; 252/62.62; 252/62.63

(58) Field of Classification Search ........... 252/62.56, 252/62.51 R, 62.58, 62.59, 62.62, 62.63
See application file for complete search history.

(56) References Cited

U.S. PATENT DOCUMENTS

| 4,582,623 | A | 4/1986 | Kubo et al. |
| 6,994,925 | B2 * | 2/2006 | Masaki ............... 428/842.8 |
| 7,132,164 | B2 | 11/2006 | Yamazaki et al. |
| 7,381,482 | B2 | 6/2008 | Yamazaki et al. |
| 2005/0282042 | A1 | 12/2005 | Yamazaki et al. |
| 2005/0282043 | A1* | 12/2005 | Yamazaki et al. ....... 428/842.8 |
| 2006/0051624 | A1 | 3/2006 | Yamazaki et al. |
| 2007/0020489 | A1 | 1/2007 | Yamazaki et al. |

FOREIGN PATENT DOCUMENTS

| JP | 03-087002 A | 4/1991 |
| JP | 04-051490 A | 2/1992 |
| JP | 07-201547 A | 8/1995 |
| JP | 2006-005299 A | 1/2006 |
| JP | 2006-005300 A | 1/2006 |
| JP | 2006-041493 A | 2/2006 |

* cited by examiner

*Primary Examiner* — Emily Le
*Assistant Examiner* — Lynne Edmondson
(74) *Attorney, Agent, or Firm* — Sughrue Mion, PLLC

(57) ABSTRACT

An aspect of the present invention relates to a method of manufacturing a hexagonal ferrite magnetic powder comprising preparing a melt by melting a starting material mixture comprising a hexagonal ferrite-forming component and a glass-forming component; rapidly cooling the melt to obtain an amorphous material comprising 0.3 to 2.0 weight percent of carbon atoms; heating the amorphous material to a temperature range of 580 to 700° C. and maintaining the amorphous material within the temperature range to precipitate hexagonal ferrite magnetic particles; and collecting the hexagonal ferrite magnetic particles precipitated.

4 Claims, 1 Drawing Sheet

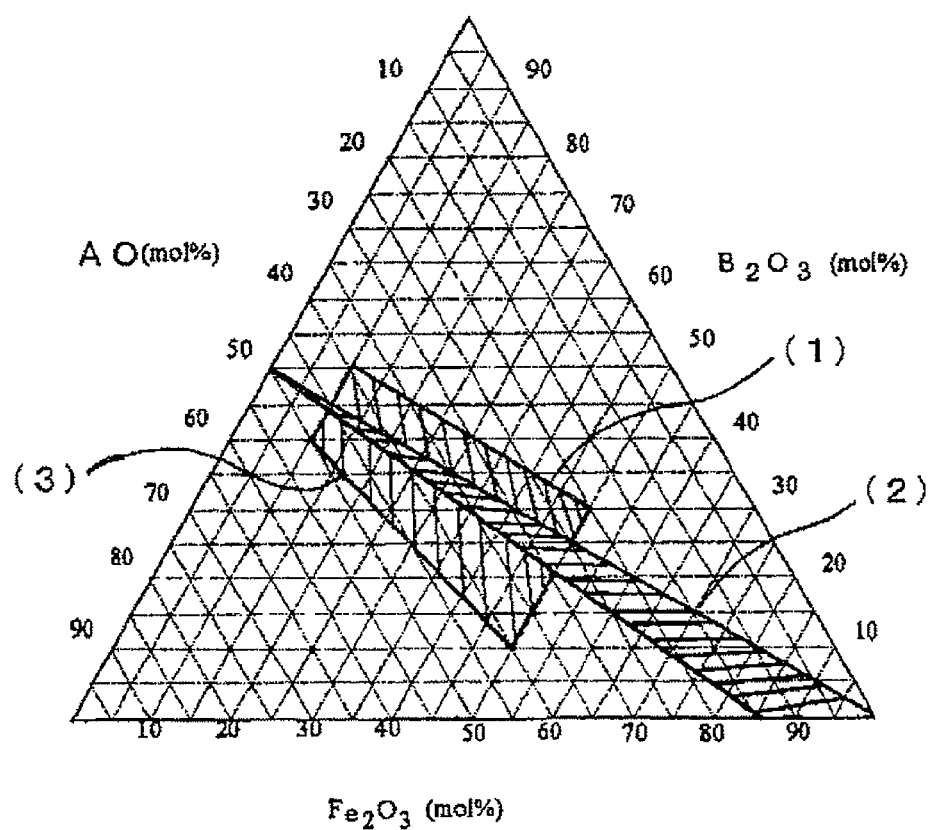

METHOD OF MANUFACTURING HEXAGONAL FERRITE MAGNETIC POWDER, MAGNETIC RECORDING MEDIUM AND METHOD OF MANUFACTURING THE SAME

CROSS-REFERENCE TO RELATED APPLICATIONS

This application claims the benefit of priority under 35 USC 119 to Japanese Patent Application No. 2009-086560, filed on Mar. 31, 2009, which is expressly incorporated herein by reference in its entirety.

BACKGROUND OF THE INVENTION

1. Field of the Invention

The present invention relates to a method of manufacturing a hexagonal ferrite magnetic powder, and more particularly, to a method of manufacturing a hexagonal ferrite magnetic powder that is suitable as the magnetic powder of a magnetic recording medium employed for recording and reproduction at surface recording densities of 1 Gbpsi and above.

The present invention further relates to a magnetic recording medium employing the hexagonal ferrite magnetic powder obtained by the above manufacturing method, and to a method of manufacturing the same.

2. Discussion of the Background

Recently, ferromagnetic metal powders have come to be primarily employed in the magnetic layers of magnetic recording media for high-density recording. Ferromagnetic metal powders are comprised of acicular particles of mainly iron, and are employed in magnetic recording media for various applications in which minute particle size and high coercivity are required for high-density recording.

With the increase in the quantity of information being recorded, magnetic recording media are required to achieve ever higher recording densities. However, in improving the ferromagnetic metal powder to achieve higher density recording, limits have begun to appear. By contrast, hexagonal ferrite magnetic powders have a coercivity that is high enough for use in permanently magnetic materials. Magnetic anisotropy, which is the basis of coercivity, derives from a crystalline structure. Thus, high coercivity can be maintained even when the particle size is reduced. Further, magnetic recording media employing hexagonal ferrite magnetic powder in the magnetic layers thereof can afford good high-density characteristics due to their vertical components. Thus, hexagonal ferrite magnetic powder is an optimal ferromagnetic material for achieving high density.

For example, Document 1 (Japanese Unexamined Patent Publication (KOKAI) Heisei No. 7-201547), Document 2 (Japanese Unexamined Patent Publication (KOKAI) Heisei No. 3-87002), Document 3 (Japanese Unexamined Patent Publication (KOKAI) Heisei No. 4-51490) or English language family member U.S. Pat. No. 4,582,623, Document 4 (Japanese Unexamined Patent Publication (KOKAI) No. 2006-5299) or English language family member US 2005/0282043 A1, Document 5 (Japanese Unexamined Patent Publication (KOKAI) No. 2006-5300) or English language family members US 2007/0020489 and U.S. Pat. No. 7,381,482, and Document 6 (Japanese Unexamined Patent Publication (KOKAI) No. 2006-41493) or English language family members US 2005/0282042 A1, U.S. Pat. No. 7,132,164 and US 2006/0051624 A1 propose manufacturing the hexagonal ferrite magnetic powders used in magnetic recording by the glass crystallization method. The contents of the above applications are expressly incorporated herein by reference in their entirety. In addition to the glass crystallization method as a method of manufacturing hexagonal ferrite powder, other known methods include the water heating synthesis method and the coprecipitation method. However, the glass crystallization method is superior as a method of manufacturing hexagonal ferrite for magnetic recording media, from the perspectives of suitability of the microparticles, suitability of the dispersion of single particles, sharp particle size distribution, and the like, which are desirable for use in magnetic recording media.

Document 1 proposes maintaining the magnetization level of the amorphous material to 0.1 to 2 emu/g to obtain hexagonal ferrite with a good SFDr. Documents 2 to 6 propose achieving uniform microparticles and grain size distribution through the starting material composition of the hexagonal ferrite to obtain hexagonal ferrite that is suited to high-density recording.

The density of recording has continued to increase in recent years. Recording densities of equal to or greater than 1 Gbpsi are now being targeted. Under such conditions, it has become difficult to provide hexagonal ferrite magnetic powders capable of achieving the targeted recording densities with glass crystallization methods, including the methods described in the above applications.

SUMMARY OF THE INVENTION

An aspect of the present invention provides for a hexagonal ferrite magnetic powder permitting ultra-high-density recording, and a magnetic recording medium suited to high-density recording, in which the hexagonal ferrite magnetic powder is employed.

Reduction of the particle size of hexagonal ferrite magnetic powder is required for reducing noise and increasing the fill rate of the magnetic layer to achieve high-density recording. However, even when the average plate diameter of hexagonal ferrite powder is reduced, when the particle size distribution is broad, components on the microparticle side of the particle size distribution are affected by thermal fluctuation, the recorded magnetic energy cannot overcome thermal energy, and there is a possibility that recording will be lost (due to thermal fluctuation demagnetization). Further, components on the coarse particle side of the particle size distribution increase noise. Accordingly, in addition to reducing the particle size, it is required to achieve a sharp particle size distribution to enhance the SNR and control demagnetization.

Generally, in the glass crystallization method, components yielding compositions of $BaO.6Fe_2O_3$ and $BaO.B_2O_3$ are melted and cooled rapidly to form an amorphous material. When the amorphous material is then heated in the atmosphere, it assumes a state intermediate between solid and liquid at about 500 to 600° C. When the elements in the amorphous material are able to move about, $BaO.6Fe_2O_3$ begins to crystallize, forming nuclear particles. As heating continues, all of the $BaO.6Fe_2O_3$ structural component in the amorphous material crystallizes. When maintained under such conditions with heating following crystallization, particles grow. In the particle growing reaction, minute particles melt into the glass substance, becoming starting materials for the growth of other particles. This reaction is thought to be based on the Ostwald ripening reaction. The particles continue to grow when the temperature is raised.

Accordingly, the present inventors reached the conclusion that controlling the reaction rate in the course of producing nuclear particles of hexagonal ferrite in the amorphous material was important to further improve the particle size distribution. As the result of further research, they discovered the following:

(1) The reaction rate in the course of producing nuclear particles of hexagonal ferrite in amorphous material could be controlled by means of the quantity of carbon atoms in the amorphous material. By preparing the amorphous material so that it contained 0.3 to 2.0 weight percent of carbon atoms, it was possible to control the reaction rate so as to obtain a hexagonal ferrite magnetic powder with a sharp particle size distribution. Although the role of carbon atoms in producing nuclear particles of hexagonal ferrite in the amorphous material was not entirely clear, the present inventors surmised the following:

Heating the amorphous material caused it to assume a state intermediate between solid and liquid. When the elements were able to move about, they crystallized all at once. When the crystallization rate in this process was either excessively fast or slow, the particle size distribution was thought to broaden. The carbon atoms in the amorphous material were thought to control the rate of crystallization, thereby contributing to achieving a sharp particle size distribution in the hexagonal ferrite magnetic powder that was obtained.

(2) Heat treating an amorphous material containing 0.3 to 2.0 weight percent of carbon atoms within a temperature range of 580 to 700° C. and causing hexagonal ferrite magnetic particles to precipitate out yielded hexagonal ferrite magnetic powder exhibiting a sharp particle size distribution. This was attributed to the fact that it was difficult to achieve a reaction rate controlling effect by means of carbon atoms when the temperature at which the hexagonal ferrite magnetic particles precipitated out (the crystallization temperature) was either too high or too low.

The present invention was devised based on the above discoveries.

An aspect of the present invention relates to a method of manufacturing a hexagonal ferrite magnetic powder comprising:

preparing a melt by melting a starting material mixture comprising a hexagonal ferrite-forming component and a glass-forming component;

rapidly cooling the melt to obtain an amorphous material comprising 0.3 to 2.0 weight percent of carbon atoms;

heating the amorphous material to a temperature range of 580 to 700° C. and maintaining the amorphous material within the temperature range to precipitate hexagonal ferrite magnetic particles; and collecting the hexagonal ferrite magnetic particles precipitated.

The starting material mixture may comprise $BaCO_3$.

The starting material mixture may comprise a carbon powder.

The average plate diameter of the hexagonal ferrite magnetic powder may range from 15 to 35 nm.

The hexagonal ferrite magnetic powder is a barium ferrite magnetic powder.

A further aspect of the present invention relates to a magnetic recording medium comprising a magnetic layer on a nonmagnetic support, wherein the magnetic layer comprises the hexagonal ferrite magnetic powder obtained by the above method and a binder.

A still further aspect of the present invention relates to a method of manufacturing a magnetic recording medium comprising:

manufacturing a hexagonal ferrite magnetic power by the above method; and forming a magnetic layer with the hexagonal ferrite magnetic power manufactured.

The magnetic layer may have a thickness of equal to or less than 80 nm.

The present invention can provide a magnetic recording medium permitting ultra-high-density recording.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the figure, wherein:

FIG. 1 is a descriptive drawing (triangular phase diagram) showing an example of the composition of the starting material mixture.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Method of Manufacturing Hexagonal Ferrite Magnetic Powder

The method of manufacturing a hexagonal ferrite magnetic powder of the present invention is for manufacturing a hexagonal ferrite magnetic powder by the glass crystallization method and comprises the following steps:

(1) preparing a melt by melting a starting material mixture comprising a hexagonal ferrite-forming component and a glass-forming component;

(2) rapidly cooling the melt to obtain an amorphous material comprising 0.3 to 2.0 weight percent of carbon atoms;

(3) heating the amorphous material to a temperature range of 580 to 700° C. and maintaining the amorphous material within the temperature range to precipitate hexagonal ferrite magnetic particles; and (4) collecting the hexagonal ferrite magnetic particles precipitated.

The method of manufacturing a hexagonal ferrite magnetic powder of the present invention will be described in greater detail below.

(1) Melting the Starting Material Mixture

The starting material mixture employed in the present invention contains a glass-forming component and a hexagonal ferrite-forming component. The term "glass-forming component" refers to a component that is capable of exhibiting a glass transition phenomenon to form an amorphous material (vitrify). A $B_2O_3$ component is normally employed as a glass-forming component in the glass crystallization method. In the present invention, it is possible to employ a starting material mixture containing a $B_2O_3$ component as the glass-forming component. In the glass crystallization method, the various components contained in the starting material mixture are present in the form of oxides or various salts that can be converted to oxides in a step such as melting. In the present invention, the term "$B_2O_3$ component" includes $B_2O_3$ itself and various salts, such as $H_3BO_3$, that can be changed into $B_2O_3$ in the process. The same holds true for other components.

Examples of glass-forming components other than $B_2O_3$ components are $SiO_2$ components and $GeO_2$ components. When employing a $B_2O_3$ component in combination with another glass-forming component, the starting material mixture desirably contains a quantity of the glass-forming component other than the $B_2O_3$ component of equal to or less than 40 mole percent, based on the oxide, relative to the $B_2O_3$-converted content of the $B_2O_3$ component. When the content is equal to or less than 40 mole percent of that of the $B_2O_3$ component, it is possible to prevent a large quantity of glass-forming component ($SiO_2$ or the like) from remaining in the hexagonal ferrite magnetic powder that is the final product and compromising electromagnetic characteristics by reducing dispersion and lowering the magnetic powder fill rate when employed in a magnetic recording medium. However, little effect is achieved by adding a quantity of less than 5 mole percent. Thus, when adding the above component, the quantity that is added is desirably equal to or greater than 5 mole percent, based on the oxide, of the $B_2O_3$-converted content of the $B_2O_3$ component. The content of the above other glass-forming component is preferably 10 to 30 mole percent, based on the oxide, of the $B_2O_3$-converted content of the $B_2O_3$ component.

Metal oxides such as $Fe_2O_3$, BaO, SrO, and PbO that serve as constituent components of hexagonal ferrite magnetic powder are examples of the hexagonal ferrite-forming component in the starting material mixture. For example, the use of a BaO component as the main component of the hexagonal ferrite-forming component makes it possible to obtain barium ferrite magnetic powder. The content of the hexagonal ferrite-forming component in the starting material mixture can be suitably set based on the desired electromagnetic characteristics.

The composition of the starting material mixture is not specifically limited. For example, the starting materials within the composition regions of hatched portions (1) to (3) in the triangular phase diagram shown in FIG. 1, with an AO component (wherein A denotes one or more selected from among Ba, Sr, Ca, and Pb, for example), $B_2O_3$ component, and $Fe_2O_3$ component as vertices, are desirable to achieve a high coercivity Hc and saturation magnetization σs. The starting materials within the component region (hatched portion (1)) defined by the four points a, b, c, and d below are particularly desirable. As set forth above, a portion of the $B_2O_3$ component can be replaced with another glass-forming component such as a $SiO_2$ component or a $GeO_2$ component. As set forth further below, it is also possible to replace a portion of the $Fe_2O_3$ component to adjust the coercivity.

(a) $B_2O_3$=50, AO=40, $Fe_2O_3$=10 mole percent
(b) $B_2O_3$=45, AO=45, $Fe_2O_3$=10 mole percent
(c) $B_2O_3$=25, AO=25, $Fe_2O_3$=50 mole percent
(d) $B_2O_3$=30, AO=20, $Fe_2O_3$=50 mole percent.

A portion of the Fe can be replaced with other metal elements to adjust the coercivity of the hexagonal ferrite magnetic powder obtained. Examples of these replacement elements are Co—Zn—Nb, Co—Ti, Co—Ti—Sn, Co—Sn—Nb, Co—Zn—Sn—Nb, Co—Zn—Zr, Nb, and Co—Zn—Mn—Nb. To obtain such a hexagonal ferrite magnetic powder, it suffices to employ an additional hexagonal ferrite-forming component to adjust the coercivity. Examples of coercivity-adjusting components are divalent metal oxide components such as CoO, NiO, and ZnO, and tetravalent metal oxide components such as $TiO_2$, $ZrO_2$, and $HfO_2$. When employing such a coercivity-adjusting component, the content can be suitably determined to achieve the desired coercivity or the like.

The starting material mixture can be obtained by weighing out and mixing the various components. In the present invention, the carbon atom content in the amorphous material that is obtained by rapidly cooling the melt of starting material mixture is 0.3 to 2.0 weight percent. The content of carbon atoms in the amorphous material can be controlled by means of the starting material mixture composition and melting conditions. Control by means of the melting conditions will be described further below. Methods such as (A) the use of a starting material mixture containing carbon powder, and (B) the use of a starting material mixture containing barium carbonate ($BaCO_3$) as the BaO component, for example, can be employed to control the composition of the starting material mixture.

The carbon powder employed in control method (A) above is not specifically limited. The use of a high-purity product is desirable to control the mixing of impurities into the product. For example, the use of carbon powder with a carbon content of about 90 to 100 weight percent is desirable. From the perspective of uniformly dispersing the carbon powder, the use of a carbon powder with an average particle size of about 10 to 2,000 nm is desirable. The carbon powder can be added in a quantity of about 0 to 5 weight percent per 100 weight percent of the combined quantity of hexagonal ferrite-forming component and glass-forming component, for example.

When employing control method (B) above, the quantity of carbon atoms within the system sometimes tends to decrease when melting at high temperature breaks down the carbonate into carbonic acid gas that is then exhausted to the exterior of the system. However, since the carbon content of the amorphous material can also be adjusted by adding carbon powder as set forth above, it is not necessary to add carbonate to the starting material mixture. That is, the carbon content of the amorphous material can be controlled by suitably combining above-described methods (A), (B), and the like.

Next, the starting material mixture is melted to obtain a melt. The melting temperature can be set based on the starting material composition, and is usually from 1,000 to 1,500° C. From the perspective of suppressing breakdown of the carbonate, the melting temperature is desirably set relative low, such as to about 1,000 to 1,400° C. It suffices to set the melting period so that the starting material mixture melts completely. From the perspective of suppressing breakdown of the carbonate, a period of about 1 to 5 hours is desirable.

(2) Converting the Melt to an Amorphous Material

Next, the melt that is obtained is rapidly cooled to obtain a solid. The solid is an amorphous material comprising glass-forming components that have been rendered amorphous (vitrified). The rapid cooling can be carried out in the same manner as in the rapid cooling step commonly employed to obtain an amorphous material in glass crystallization methods. For example, a known method can be conducted, such as a rapid cooling rolling method in which the melt is poured onto a pair of water-cooled rollers being rotated at high speed.

The carbon atom content of the amorphous material that is obtained by rapid cooling is 0.3 to 2.0 weight percent of the total weight of the amorphous material. When the carbon content of the amorphous material is less then 0.3 weight percent, the particle size distribution cannot be adequately improved. When it exceeds 2.0 weight percent, the particle size distribution of the hexagonal ferrite magnetic powder that is obtained increases. This is thought to be the result of excessive suppression of crystallization. From the perspective of controlling the particle size distribution, the carbon atoms in the amorphous material desirably fall within a range of 0.5 to 1.5 weight percent. The methods of controlling the quantity of carbon atoms in the amorphous material are as set forth above.

(3) Heat Treating the Amorphous Material

Following rapid cooling, the amorphous material obtained is subjected to a heat treatment. This step causes hexagonal ferrite magnetic particles to crystallize and precipitate out into the amorphous (glass) phase. In the present invention, the heat treatment is conducted by heating the amorphous material, which has been obtained by rapid cooling, to within a temperature range of 580 to 700° C. and maintaining it for a prescribed period within this temperature range to precipitate hexagonal ferrite magnetic particles. When the heating temperature (also referred to as the "crystallization temperature" hereinafter) exceeds 700° C., the reaction rate-suppressing effect of the carbon atoms diminishes, making it difficult to obtain hexagonal ferrite magnetic powder with a sharp particle size distribution. When less than 580° C., a long period is required for crystallization, eliminating the reaction rate-suppressing effect of the carbon atoms. The extended period of crystallization also basically increases the particle size distribution. Thus, it is difficult to obtain hexagonal ferrite magnetic powder with a sharp particle size distribution in this case, as well.

The particle size of the precipitated hexagonal ferrite magnetic powder can be controlled by means of the heating temperature and heating period. Thus, in the present invention, a suitable heating temperature is desirably selected within a range of 580 to 700° C. based on the targeted particle size. To obtain microparticulate hexagonal ferrite magnetic powder, the crystallization temperature is desirably selected within a range of 590 to 680° C. A rate of temperature rise to within the above temperature range of about 10 to 500° C./minute, for example, is suitable. The temperature is maintained within the above temperature range, for example, for a period of 1 to 12 hours, preferably 2 to 6 hours.

(4) Collecting the Hexagonal Ferrite Magnetic Particles

The heat treated product is normally comprised of hexagonal ferrite magnetic particles and by-products. The various treatments generally conducted in the glass crystallization method, such as acid treatment with heating, can be employed to remove the by-products and collect the hexagonal ferrite magnetic particles. The particles from which excess components have been removed by this treatment can be post-processed by washing with water, drying, and the like as needed to obtain hexagonal ferrite magnetic powder that is suited to magnetic recording media.

By means of the above steps, the present invention makes it possible to obtain microparticulate hexagonal ferrite magnetic powder with a sharp particle size distribution that is suited to high-density recording. The particle size of the hexagonal ferrite magnetic powder, as an average plate diameter, desirably falls within a range of 15 to 35 nm. At an average plate diameter of less than 15 nm, dispersion by existing techniques may be difficult. Even when the particle size distribution is uniform, substantial demagnetization due to thermal fluctuation sometimes makes it difficult to obtain a reliable recording medium. Further, the precipitation of particles exceeding 35 nm in average plate diameter requires raising the crystallization temperature, tending to broaden the particle size distribution. That may be caused by reducing the suppressing effect on the rate of crystallization due to carbon atoms. The average plate diameter is the average value of plate diameters measured by randomly extracting 500 particles in a photograph taken by a transmission electron microscope. In the present invention, the term "average plate ratio" is the arithmetic average of (plate diameter/plate thickness) of 500 particles randomly extracted as set forth above. The average plate ratio of the hexagonal ferrite magnetic powder obtained by means of the present invention is not specifically limited, and can be about 2 to 5, for example.

The particle size distribution of the hexagonal ferrite magnetic powder obtained can be evaluated as a value (coefficient of variation in particle diameter) calculated by, for example, randomly extracting 500 particles in a photograph taken by a transmission electron microscope, calculating the average value (average plate diameter) of the plate diameters measured, calculating the standard deviation of the plate diameters of the 500 particles, and dividing it by the average plate diameter. Hexagonal ferrite magnetic powder exhibiting a particle size distribution in the form of a coefficient of variation in particle diameter of equal to or lower than 25 percent, for example, of 15 to 25 percent, can be obtained by the present invention. Hexagonal ferrite magnetic powder with a broad particle size distribution contains a large number of particles that deviate considerably from the average plate diameter. A microparticle component that deviates considerably from the average plate diameter can cause thermal fluctuation demagnetization. Further, a coarse particle component that deviates considerably from the average plate diameter can also cause noise. While a large number of particles that can compromise recording characteristics such as those set forth above are present in hexagonal ferrite magnetic powder with a broad particle diameter distribution, the present invention makes it possible to obtain a hexagonal ferrite magnetic powder exhibiting a sharp particle size distribution and thus having good recording characteristics.

Magnetic Recording Medium and Method of Manufacturing the Same

The magnetic recording medium of the present invention comprises, on a nonmagnetic support, a magnetic layer comprising the hexagonal ferrite magnetic powder obtained by the manufacturing method of the present invention and a binder.

The method of manufacturing a magnetic recording medium of the present invention comprises manufacturing a hexagonal ferrite magnetic power by the manufacturing method of the present invention and forming a magnetic layer with the hexagonal ferrite magnetic power manufactured.

The magnetic recording medium of the present invention and the method of manufacturing a magnetic recording medium of the present invention will be described in further detail below.

Magnetic Layer

Details of the hexagonal ferrite magnetic powder employed in the magnetic layer, and the method of manufacturing the powder, are as set forth above. In addition to hexagonal ferrite magnetic powder, the magnetic layer comprises a binder. Examples of the binder comprised in the magnetic layer are: polyurethane resins; polyester resins; polyamide resins; vinyl chloride resins; styrene; acrylonitrile; methyl methacrylate and other copolymerized acrylic resins; nitrocellulose and other cellulose resins; epoxy resins; phenoxy resins; and polyvinyl acetal, polyvinyl butyral, and other polyvinyl alkyral resins. These may be employed singly or in combinations of two or more. Of these, the desirable binders are the polyurethane resins, acrylic resins, cellulose resins, and vinyl chloride resins. These resins may also be employed as binders in the nonmagnetic layer described further below. A polyisocyanate curing agent may also be employed with the above resins.

To enhance the dispersibility of ferromagnetic powder and nonmagnetic powder in the above binder, the binder desirably comprises functional groups (polar groups) adsorbing to the surface of these powders. Examples of desirable functional groups are: —$SO_3M$, —$SO_4M$, —$PO(OM)_2$, —$OPO(OM)_2$, —COOM, =$NSO_3M$, =$NRSO_3M$, —$NR^1R^2$, and —$N^+R^1R^2R^3X^-$. In the above, M denotes hydrogen or an alkali metal such as Na or K; R denotes an alkylene group; $R^1$, $R^2$, and $R^3$ denote alkyl groups, hydroxyalkyl groups, or hydrogen; and X denotes a halogen such as Cl or Br. The quantity of functional groups in the binder is desirably equal to or higher than 10 μeq/g and equal to or lower than 200 μeq/g, preferably equal to or higher than 30 μeq/g and equal to or lower than 120 μeq/g. The quantity of functional groups desirably falls within the above range because good dispersibility can be achieved therein.

The molecular weight of the binder is desirably a weight average molecular weight of equal to or greater than 10,000 and equal to or lower than 200,000. The molecular weight desirably falls within the above range because adequate coating strength and good durability can be obtained and dispersibility can be increased.

The binder can be employed in a range of, for example, 5 to 50 weight percent, desirably 10 to 30 weight percent, of the nonmagnetic powder in the nonmagnetic layer or of the magnetic powder in the magnetic layer.

As needed, additives can be added to the magnetic layer. Examples of additives are: abrasives, lubricants, dispersing agents, dispersion adjuvants, antifungal agents, antistatic agents, oxidation inhibitors, solvents, and carbon black. These additives may be employed in the form of a commercial product suitably selected based on desired properties.

Examples of types of carbon black that are suitable for use in the magnetic layer are: furnace black for rubber, thermal for rubber, black for coloring, and acetylene black. It is preferable that the specific surface area is 5 to 500 $m^2$/g, the DBP oil absorption capacity is 10 to 400 ml/100g, the particle diameter is 5 to 300 nm, the pH is 2 to 10, the moisture content is 0.1 to 10 percent, and the tap density is 0.1 to 1 g/ml. When employing carbon black, the quantity preferably ranges from 0.1 to 30 weight percent with respect to the weight of the ferromagnetic powder. For example, the *Carbon Black Handbook* compiled by the Carbon Black Association, which is expressly incorporated herein by reference in its entirety, may be consulted for types of carbon black suitable for use in the present invention. Commercially available carbon black can be employed.

As needed, the types and quantities of additives employed in the magnetic layer may differ from those employed in the nonmagnetic layer, described further below, in the present invention. All or some part of the additives employed in the present invention can be added in any of the steps during the manufacturing of coating liquids for the magnetic layer and nonmagnetic layer. For example, there are cases where they are mixed with the magnetic powder prior to the kneading step; cases where they are added during the step in which the magnetic powder, binder, and solvent are kneaded; cases where they are added during the dispersion step; cases where they are added after dispersion; and cases where they are added just before coating. When dispersing the hexagonal ferrite magnetic powder, the particle surface of the magnetic powder can be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added normally range from 0.1 to 10 weight percent relative to the weight of the magnetic powder. The pH of the magnetic powder normally ranges from about 4 to 12, and is usually optimum for the dispersion medium and polymer. From the perspective of the chemical stability and storage properties of the medium, a pH of about 6 to 10 is usually selected. As for moisture contained in the magnetic powder, there is an optimum level for the dispersion medium and polymer, usually selected from the range of 0.01 to 2.0 weight percent.

Nonmagnetic Layer

Details of the nonmagnetic layer will be described below. The magnetic recording medium of the present invention may comprise a nonmagnetic layer comprising a nonmagnetic powder and a binder between the nonmagnetic support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. These nonmagnetic powders are commercially available and can be manufactured by the known methods.

Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped. The crystallite size of the nonmagnetic powder preferably ranges from 4 nm to 500 nm, more preferably from 40 to 100 nm. A crystallite size falling within a range of 4 nm to 500 nm is desirable in that it facilitates dispersion and imparts a suitable surface roughness. The average particle diameter of the nonmagnetic powder preferably ranges from 5 nm to 500 nm. As needed, nonmagnetic powders of differing average particle diameter may be combined; the same effect may be achieved by broadening the average particle distribution of a single nonmagnetic powder. The particularly preferred average particle diameter of the nonmagnetic powder ranges from 10 to 200 nm. Within a range of 5 nm to 500 nm, dispersion can be good and a nonmagnetic layer with suitable surface roughness can be achieved; the above range is preferred.

The specific surface area of the nonmagnetic powder preferably ranges from 1 to 150 m²/g, more preferably from 20 to 120 m²/g, and further preferably from 50 to 100 m²/g. Within the specific surface area ranging from 1 to 150 m²/g, a nonmagnetic layer with suitable surface roughness can be achieved and dispersion of the nonmagnetic powder is possible with the suitable quantity of binder; the above range is preferred. Oil absorption capacity using dibutyl phthalate (DBP) of the nonmagnetic powder preferably ranges from 5 to 100 mL/100 g, more preferably from 10 to 80 mL/100 g, and further preferably from 20 to 60 mL/100 g. The specific gravity ranges from, for example, 1 to 12, preferably from 3 to 6. The tap density ranges from, for example, 0.05 to 2 g/mL, preferably from 0.2 to 1.5 g/mL. A tap density falling within a range of 0.05 to 2 g/mL can reduce the amount of scattering particles, thereby facilitating handling, and tends to prevent solidification to the device. The pH of the nonmagnetic powder preferably ranges from 2 to 11, more preferably from 6 to 9. When the pH falls within a range of 2 to 11, increase of the coefficient of friction at high temperature or high humidity or due to the freeing of fatty acids can be prevented.

The moisture content of the nonmagnetic powder preferably ranges from 0.1 to 5 weight percent, more preferably from 0.2 to 3 weight percent, and further preferably from 0.3 to 1.5 weight percent. A moisture content falling within a range of 0.1 to 5 weight percent is desirable because it can produce good dispersion and yield a stable coating viscosity following dispersion. An ignition loss of equal to or less than 20 weight percent is desirable and nonmagnetic powders with low ignition losses are desirable.

When the nonmagnetic powder is an inorganic powder, the Mohs' hardness is preferably 4 to 10. Durability can be ensured if the Mohs' hardness ranges from 4 to 10. The stearic acid (SA) adsorption capacity of the nonmagnetic powder preferably ranges from 1 to 20 µmol/m², more preferably from 2 to 15 µmol/m². The heat of wetting in 25° C. water of the nonmagnetic powder is preferably within a range of 200 to 600 erg/cm² (200 to 600 mJ/m²). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9. The surface of these nonmagnetic powders preferably contains $Al_2O_3$, $SiO_2$, $TiO_2$, $ZrO_2$, $SnO_2$, $Sb_2O_3$, and ZnO by conducting surface treatment. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. They may be employed singly or in combination. Depending on the objective, a surface-treatment coating layer with a coprecipitated material may also be employed, the method which comprises a first alumina coating and a second silica coating thereover or the reverse method thereof may also be adopted. Depending on the objective, the surface-treatment coating layer may be a porous layer, with homogeneity and density being generally desirable.

Carbon black may be combined with nonmagnetic powder in the nonmagnetic layer to reduce surface resistivity, reduce light transmittance, and adjust hardness. For example, furnace black for rubber, thermal black for rubber, black for coloring, acetylene black and the like may be employed in the nonmagnetic layer.

The specific surface area of the carbon black employed in the nonmagnetic layer is, for example, 100 to 500 m²/g, preferably 150 to 400 m²/g. The DBP oil absorption capability is, for example, 20 to 400 mL/100 g, preferably 30 to 200 mL/100 g. The particle diameter of the carbon black is, for example, 5 to 80 nm, preferably 10 to 50 nm, and more preferably, 10 to 40 nm. It is preferable that the pH of the carbon black is 2 to 10, the moisture content is 0.1 to 10 percent, and the tap density is 0.1 to 1 g/mL. The carbon black employed may be surface-treated with a dispersant or grafted with resin, or have a partially graphite-treated surface. The carbon black may be dispersed in advance into the binder prior to addition to the coating liquid. The quantity of the carbon black is preferably within a range not exceeding 50 weight percent of the nonmagnetic powder as well as not exceeding 40 percent of the total weight of the nonmagnetic layer. These carbon blacks may be used singly or in combination. For example, the *Carbon Black Handbook* compiled by the Carbon Black Association may be consulted for types of carbon black suitable for use in the nonmagnetic layer. Commercially available carbon black can be employed.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above applications are expressly incorporated herein by reference in their entirety.

Binder resins, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersion agents employed in the magnetic layer may be adopted thereto.

An undercoating layer can be provided in the magnetic recording medium of the present invention. Providing an undercoating layer can enhance adhesive strength between the support and the magnetic layer or nonmagnetic layer. For example, a polyester resin that is soluble in solvent can be employed as the undercoating layer.

Nonmagnetic Support

A known film such as biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The center average roughness, Ra, at a cutoff value of 0.25 mm of the nonmagnetic support suitable for use in the present invention preferably ranges from 3 to 10 nm.

Layer Structure

As for the thickness structure of the magnetic recording medium of the present invention, the thickness of the nonmagnetic support preferably ranges from 3 to 80 micrometers. When an undercoating layer is provided between the nonmagnetic support and the nonmagnetic layer or the magnetic layer, the thickness of the undercoating layer ranges from, for example, 0.01 to 0.8 micrometer, preferably 0.02 to 0.6 micrometer.

The thickness of the magnetic layer is desirably equal to or less than 80 nm. An improved SNR enhancing effect due to a sharp particle size distribution can be achieved by employing a hexagonal ferrite magnetic powder with a sharp particle size distribution in the magnetic layer. This effect is particularly marked in a thin magnetic layer of equal to or less than 80 nm in thickness. This is attributed to the effects of the presence of little extremely fine microparticle component, which causes thermal fluctuation demagnetization, and to the presence of little extremely coarse particle component, which is thought to affect noise, in a thin magnetic layer in which the total number of magnetic particles is small. The thickness of the magnetic layer preferably falls within a range of 30 to 60 nm.

The nonmagnetic layer is, for example, 0.1 to 3.0 micrometers, preferably 0.3 to 2.0 micrometers, and more preferably, 0.5 to 1.5 micrometers in thickness. The nonmagnetic layer of the magnetic recording medium of the present invention can exhibit its effect so long as it is substantially nonmagnetic. It can exhibit the effect of the present invention, and can be deemed to have essentially the same structure as the magnetic recording medium of the present invention, for example, even when impurities are contained or a small quantity of magnetic material is intentionally incorporated. The term "essentially the same" means that the residual magnetic flux density of the nonmagnetic layer is equal to or lower than 10 mT, or the coercivity is equal to or lower than 7.96 kA/m (approximately equal to or lower than 100 Oe), with desirably no residual magnetic flux density or coercivity being present.

Backcoat Layer

A backcoat layer can be provided on the surface of the nonmagnetic support opposite to the surface on which the magnetic layer and optionally the nonmagnetic layer are provided, in the magnetic recording medium of the present invention. The backcoat layer desirably comprises carbon black and inorganic powder. The formula of the magnetic layer or nonmagnetic layer can be applied to the binder and various additives for the formation of the back layer. The backcoat layer is preferably equal to or less than 0.9 micrometer, more preferably 0.1 to 0.7 micrometer, in thickness.

Manufacturing Method

The process for manufacturing magnetic layer, nonmagnetic layer and backcoat layer coating liquids normally comprises at least a kneading step, a dispersing step, and a mixing step to be carried out, if necessary, before and/or after the kneading and dispersing steps. Each of the individual steps may be divided into two or more stages. All of the starting materials employed in the present invention, including the hexagonal ferrite magnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads may be employed to disperse the magnetic layer, nonmagnetic layer and back layer coating liquids, with a dispersing medium with a high specific gravity such as zirconia beads, titania beads, and steel beads being suitable for use as the glass beads. The particle diameter and fill ratio of these dispersing media can be optimized for use. A known dispersing device may be employed.

In the method for manufacturing a magnetic recording medium, for example, a nonmagnetic layer coating liquid is coated to yield a prescribed film thickness on the surface of a running nonmagnetic support, thereby forming a nonmagnetic layer, and a magnetic layer coating liquid is then coated to yield a prescribed film thickness thereover, forming a magnetic layer. Multiple magnetic layer coating liquids may be successively or simultaneously coated in a multilayer coating, or a nonmagnetic layer coating liquid and magnetic layer coating liquid can be successively or simultaneously coated in a multilayer coating. Coating machines suitable for use in coating the magnetic layer and nonmagnetic layer coating liquids are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center K.K. may be referred to in this regard. The content of the above publication is expressly incorporated herein by reference in its entirety.

When it is a magnetic tape, the coating layer that is formed by applying the magnetic layer coating liquid can be magnetic field orientation processed using cobalt magnets or solenoids on the hexagonal ferrite magnetic powder contained in the coating layer. When it is a disk, an adequately isotropic orientation can be achieved in some products without orientation using an orientation device, but the use of a known random orientation device in which cobalt magnets are alternately arranged diagonally, or alternating fields are applied by solenoids, is desirable. Further, a known method, such as opposing magnets of opposite poles, can be employed to effect perpendicular orientation, thereby imparting an isotropic magnetic characteristic in the peripheral direction. Perpendicular orientation is particularly desirable when conducting high-density recording. Spin coating can be used to effect peripheral orientation.

The drying position of the coating is desirably controlled by controlling the temperature and flow rate of drying air, and coating speed. A coating speed of 20 m/min to 1,000 m/min and a dry air temperature of equal to or higher than 60° C. are desirable. Suitable predrying can be conducted prior to entry into the magnet zone.

The coated stock material thus obtained can be normally temporarily wound on a take-up roll, and then unwound from the take-up roll and calendered.

For example, super calender rolls can be employed in calendering. Calendering can enhance surface smoothness, eliminate voids produced by the removal of solvent during drying, and increase the fill rate of the hexagonal ferrite magnetic powder in the magnetic layer, thus yielding a magnetic recording medium of good electromagnetic characteristics. The calendering step is desirably conducted by varying the calendering conditions based on the smoothness of the surface of the coated stock material.

Rolls of a heat-resistant plastic such as epoxy, polyimide, polyamide, or polyamidoimide, can be employed as the calender rolls. Processing with metal rolls is also possible.

As for the calendering conditions, the calender roll temperature ranges from, for example, 60 to 100° C., preferably 70 to 100° C., and more preferably, 80 to 100° C. The pressure ranges from, for example, 100 to 500 kg/cm (approximately 98 to 490 kN/m), preferably 200 to 450 kg/cm (approximately 196 to 441 kN/m), and more preferably, 300 to 400 kg/cm (approximately 294 to 392 kN/m). Calendering can be conducted on the surface of the nonmagnetic layer, for example, under the above conditions.

The magnetic recording medium obtained can be cut to desired size with a cutter or the like for use. The cutter is not specifically limited, but desirably comprises multiple sets of a rotating upper blade (male blade) and lower blade (female blade). The slitting speed, engaging depth, peripheral speed ratio of the upper blade (male blade) and lower blade (female blade) (upper blade peripheral speed/lower blade peripheral speed), period of continuous use of slitting blade, and the like can be suitably selected.

EXAMPLES

The present invention will be described in detail below based on examples. However, the present invention is not limited to the examples. The terms "parts" and "percent" given in Examples are weight parts and weight percent unless specifically stated otherwise.

Examples 1-1 to 1-10, Comparative Examples 1-1 to 1-8

(1) Preparation of the Amorphous Material

Amorphous materials A to J in Table 1 were prepared by the following method.

Various components in the form of $BaCO_3$ in a quantity corresponding the BaO indicated in Table 1, $H_3BO_3$ in a quantity corresponding to the $B_2O_3$ indicated in Table 1, $Fe_2O_3$ in the quantity stated in Table 1 (where a Co-containing component, Zn-containing component, and Nb-containing component were added to the starting material mixture so that a portion of the Fe in the $Fe_2O_3$ was replaced with Co=0.5 at %, Zn=1.5 at %, and Nb=1 at %), and high-purity carbon powder (carbon atom content of equal to or greater than 95 weight percent, average particle diameter 30 nm) were weighed out and mixed in a mixer to obtain a starting material mixture. The starting material mixture obtained was charged to a one-liter platinum crucible and melted for three hours under the conditions shown in Table 1. The melt was rapidly heated to 1,380° C. in from five minutes to 10 minutes. While stirring the melt, a melt outlet provided in the bottom of the platinum crucible was heated, and the melt was extruded in the form of a rod at about 6 g/s. The extruded liquid was rapidly cooled and rolled with a pair of water-cooled rolls to produce an amorphous material.

With the exception that 20 mole percent of the $B_2O_3$ was replaced with $SiO_2$, amorphous material K in Table 1 was produced by the same method as above. The quantity of carbon atoms in the amorphous material was measured by fluorescent X-ray diffraction. The results are given in Table 1.

TABLE 1

| Amorphous material No. | Quantity of carbon powder added (weight percent Note 1)) | BaO (mol %) | $B_2O_3$ (mol %) | $Fe_2O_3$ (mol %) | Melting temp. (° C.) | Carbon content (weight percent) |
|---|---|---|---|---|---|---|
| A | 0 | 38.6 | 34.1 | 27.3 | 1250 | 0.1 |
| B | 0 | 38.6 | 34.1 | 27.3 | 1350 | 0.07 |
| C | 0 | 38.6 | 34.1 | 27.3 | 1450 | 0.05 |
| D | 0 | 38.6 | 34.1 | 27.3 | 1150 | 0.8 |
| E | 0 | 38.6 | 34.1 | 27.3 | 1200 | 0.4 |
| F | 1.2 | 38.6 | 34.1 | 27.3 | 1250 | 1.1 |
| G | 2.0 | 38.6 | 34.1 | 27.3 | 1350 | 1.8 |
| H | 2.8 | 38.6 | 34.1 | 27.3 | 1450 | 2.6 |
| I | 1.9 | 41.8 | 38.4 | 19.8 | 1250 | 1.7 |
| J | 1.0 | 35.2 | 29.4 | 35.4 | 1250 | 0.9 |
| K | 1.0 | 38.6 | 34.1 | 27.3 | 1250 | 0.8 |

Note 1)
Given as the value calculated by adopting the combined quantity of starting material components without the carbon powder as 100 weight percent.

It will be understood from the results in Table 1 that it was possible to control the quantity of carbon atoms in the amorphous material by means of the melt temperature and the quantity of carbon powder added.

(2) Preparation of Hexagonal Ferrite Magnetic Powder

A 300 g quantity of each of the amorphous materials indicated in Table 1 was charged to an electric furnace and the temperature was raised by 30° C./min to the crystallization temperatures indicated in Table 2. The amorphous material was maintained at the crystallization temperature for five hours to precipitate (crystallize) out hexagonal ferrite magnetic powder. Next, the crystallized product containing hexagonal ferrite magnetic powder was roughly comminuted in a mortar. To a 2000 mL glass bottle were added 1,000 g of Zr beads 1 mm in diameter and 800 mL of a one percent concentration of acetic acid. The mixture was dispersed for three hours in paint shaker. Subsequently, the dispersion was separated from the beads and placed in a three-liter stainless steel beaker. The dispersion was processed for three hours at 100° C. and precipitated in a centrifugal separator. Washing was conducted by repeated decantation and then the product was dried, yielding hexagonal ferrite powder. The shapes of 500 particles were measured by TEM, and the average plate diameter, average plate ratio, and coefficient of variation in plate diameter were determined. The results are given in Table 2. Further, the powders obtained in Examples and in Comparative Examples were analyzed by X-ray diffraction to confirm that they were hexagonal ferrite (barium ferrite).

TABLE 2

|  | Amorphous material No. | Crystallization temp. (° C.) | Magnetic powder characteristics | | |
|---|---|---|---|---|---|
|  |  |  | Average plate diameter (nm) | Average plate ratio | Coefficient of variation in plate diameter |
| Comp. Ex. 1-1 | A | 640 | 20 | 2.9 | 30 |
| Comp. Ex. 1-2 | B | 640 | 20 | 3.1 | 30 |
| Comp. Ex. 1-3 | B | 640 | 20 | 3.1 | 30 |
| Comp. Ex. 1-4 | B | 710 | 40 | 3.3 | 40 |
| Comp. Ex. 1-5 | C | 640 | 25 | 3.0 | 35 |
| Example 1-1 | D | 640 | 20 | 3.0 | 22 |
| Example 1-2 | E | 640 | 22 | 3.0 | 25 |
| Example 1-3 | F | 630 | 16 | 2.8 | 18 |
| Example 1-4 | F | 640 | 18 | 3.1 | 20 |
| Example 1-5 | F | 640 | 18 | 3.1 | 20 |
| Example 1-6 | F | 680 | 33 | 3.3 | 23 |
| Comp. Ex. 1-6 | F | 710 | 38 | 3.3 | 35 |
| Comp. Ex. 1-8 | F | 570 | 10 | Measurement was not possible. | Measurement was not possible. |
| Example 1-7 | G | 640 | 19 | 2.9 | 25 |
| Comp. Ex. 1-7 | H | 640 | 18 | 3.0 | 40 |
| Example 1-8 | I | 640 | 19 | 3.0 | 25 |
| Example 1-9 | J | 640 | 20 | 3.1 | 20 |
| Example 1-10 | K | 680 | 17 | 3.0 | 18 |

From the results in Table 2, it will be understood that the hexagonal ferrite magnetic powders of Examples 1-1 to 1-10, obtained by controlling the carbon atom content and crystallization temperature of the amorphous material, had lower coefficients of variation in plate diameter, exhibiting sharper particle size distributions than the hexagonal magnetic powders obtained in Comparative Examples 1-1 to 1-7. Comparative Example 1-8 was an example in which the crystallization temperature was less than 580° C. Since crystallization did not progress adequately, the particles were too fine and the individual particles could not be observed, precluding the measurement of the average plate ratio and coefficient of variation in plate diameter. The coercivity was 45 kA/m as measured by a vibrating sample fluxmeter (made by Toei Industry Co., Ltd.) at a magnetic field intensity of 1,194 kA/m (15 kOe).

Examples 2-1 to 2-10, Comparative Examples 2-1 to 2-7

1. Magnetic Layer Coating Liquid

| | |
|---|---|
| Barium ferrite magnetic powder: See Table 3 | 100 parts |
| Polyurethane resin | 12 parts |
| Weight average molecular weight: 10,000 | |
| Sulfonic functional group: 0.5 meq/g | |
| Diamond microparticle (Average particle diameter: 50 nm) | 2 parts |
| Carbon black (Particle size: 0.015 μm) | 0.5 part |
| #55 (made by Asahi Carbon Co., Ltd.) | |
| Stearic acid | 0.5 part |
| Butyl stearate | 2 parts |
| Methyl ethyl ketone | 180 parts |
| Cyclohexanone | 100 parts |

2. Nonmagnetic Layer Coating Liquid

| | |
|---|---|
| Nonmagnetic powder α-iron oxide | 100 parts |
| Average primary particle diameter: 0.09 μm | |
| Specific surface area by BET method: 50 m/g | |
| pH: 7 | |
| DBP oil absorption capacity: 27 to 38 g/100 g | |
| Surface treatment agent: Al$_2$O$_3$, 8 weight percent | |
| Carbon black CONDUCTEX SC-U | 25 parts |
| (made by Columbia Carbon Co., Ltd.) | |
| Vinyl chloride copolymer | 13 parts |
| MR 104 (made by Nippon Zeon Co., Ltd.) | |
| Polyurethane resin | 5 parts |
| UR 8200 (made by Toyobo Co., Ltd.) | |
| Phenyl phosphonic acid | 3.5 parts |
| Butyl stearate | 1 part |
| Stearic acid | 2 parts |
| Methyl ethyl ketone | 205 parts |
| Cyclohexanone | 135 parts |

3. Preparation of Magnetic Tape

The various components of each of the above coating liquids were kneaded in a kneader. The liquid was pumped into a horizontal sand mill packed with a 65 percent volume (relative to the dispersion element) of zirconia beads 1.0 mm in diameter, and the mixture was dispersed for 120 hours at 2,000 rpm (the time essentially present in the dispersion element). To the dispersion obtained were added 6.5 parts of polyisocyanate in the case of the nonmagnetic layer coating liquid, and 7 parts of methyl ethyl ketone. The mixture was filtered with a filter having an average pore diameter of 1 micrometer to prepare coating liquids for forming a nonmagnetic layer and a magnetic layer.

The nonmagnetic layer coating liquid obtained was coated to a 5 micrometer polyethylene naphthalate base and dried to a dry thickness of 1.0 micrometers, after which a magnetic layer was successively coated in a multilayer coating to yield the thickness indicated in Table 3. Following drying, the coatings were processed with a seven-stage calender at a temperature of 90° C. and a linear pressure of 300 kg/cm. The product was slit to ¼ inch width and surface polished to obtain magnetic tape.

Evaluation Methods

1. Magnetic characteristics (Hc and Switching-Field Distribution (SFD))

The Hc and SFD were measured at a magnetic field intensity of 1,194 kA/m (15 kOe) with a vibrating sample fluxmeter (made by Toei Industry Co., Ltd.).

2. Output, SNR

Measurement was conducted with a recording head (MIG, 0.15 μm gap, 1.8 T) and a GMR reproduction head mounted on a drum tester. A signal was recorded at a track density of 16 KTPI and a linear recording density of 400 Kbpi, after which the output and SNR were measured. The results are given in Table 3, with Comparative Example 1 as 0 dB.

(3) Demagnetization

The tape was saturation magnetized at 1,194 kA/m (15 kOe) with the vibrating sample fluxmeter, the polarity of the magnetic field was changed, a 500 Oe inversion magnetic field was applied, and the demagnetization was calculated with the following equation from the level of magnetization at 0 seconds and at 60 seconds.

Demagnetization (%)=1−(level of magnetization at 60 s/level of magnetization at 0 s)×100

The above results are given in Table 3.

TABLE 3

| | Ferromagnetic powder | Magnetic layer thickness (nm) | Hc (kA/m) | SFD | Output (dB) | Noise (dB) | SNR (dB) | Demagnetization (%) |
|---|---|---|---|---|---|---|---|---|
| Comp. Ex. 2-1 | Comp. Ex. 1-1 | 60 | 200 | 0.52 | 0 | 0 | 0 | 15 |
| Comp. Ex. 2-2 | Comp. Ex. 1-2 | 60 | 200 | 0.53 | 0.1 | 0.3 | −0.2 | 13 |
| Comp. Ex. 2-3 | Comp. Ex. 1-3 | 100 | 201 | 0.55 | 0.3 | 0.6 | −0.3 | 13 |
| Comp. Ex. 2-4 | Comp. Ex. 1-4 | 60 | 255 | 0.38 | 1.1 | 3.5 | −2.4 | 7 |
| Comp. Ex. 2-5 | Comp. Ex. 1-5 | 60 | 207 | 0.48 | 0.2 | 0.4 | −0.2 | 13 |
| Example 2-1 | Example 1-1 | 60 | 203 | 0.36 | 0.6 | −0.6 | 1.2 | 7 |
| Example 2-2 | Example 1-2 | 60 | 209 | 0.32 | 1.0 | −0.8 | 1.8 | 4 |
| Example 2-3 | Example 1-3 | 60 | 186 | 0.38 | 0 | −2.4 | 2.4 | 8 |
| Example 2-4 | Example 1-4 | 60 | 221 | 0.32 | 1.4 | −0.4 | 1.8 | 6 |
| Example 2-5 | Example 1-5 | 100 | 221 | 0.33 | 1.5 | 0.3 | 1.2 | 5 |
| Example 2-6 | Example 1-6 | 60 | 230 | 0.30 | 2.1 | 0.8 | 1.3 | 3 |
| Comp. Ex. 2-6 | Comp. Ex. 1-6 | 60 | 250 | 0.38 | 1.1 | 3.4 | −2.3 | 2 |
| Example 2-7 | Example 1-7 | 60 | 199 | 0.36 | 0.8 | −0.6 | 1.4 | 7 |
| Comp. Ex. 2-7 | Comp. Ex. 1-7 | 60 | 199 | 0.52 | −0.2 | 0.9 | −1.1 | 22 |
| Example 2-8 | Example 1-8 | 60 | 200 | 0.34 | 0.7 | −1.0 | 1.7 | 8 |
| Example 2-9 | Example 1-9 | 60 | 199 | 0.32 | 1.2 | −1.2 | 2.4 | 6 |
| Example 2-10 | Example 1-10 | 60 | 195 | 0.32 | 1.6 | −2.6 | 4.2 | 10 |

From the results given in Table 3, it can be confirmed that all the magnetic tapes of the Examples in which magnetic powders with sharp particle size distributions were employed exhibited better SNR and less demagnetization than the magnetic tapes of Comparative Examples. In Comparative Examples 2-2 and 2-3, in which the same magnetic powder was employed, no great difference in SNR or demagnetization was seen despite different magnetic layer thicknesses. By contrast, in Examples 2-4 and 2-5, in which the same magnetic powder was employed, the effects of SNR enhancement and reduction in demagnetization were increased by thinning the magnetic layer.

From the above results, it can be confirmed that the present invention can enhance the SNR and reduce demagnetization, and that these effects are pronounced in a thin magnetic layer.

The present invention can provide a magnetic recording medium for high-density recording exhibiting excellent magnetic characteristics.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing a hexagonal ferrite magnetic powder comprising:
   preparing a melt by melting a starting material mixture comprising a hexagonal ferrite-forming component and a glass-forming component;
   rapidly cooling the melt to obtain an amorphous material comprising 0.3 to 2.0 weight percent of carbon atoms;
   heating the amorphous material to a temperature range of 580 to 700° C. and maintaining the amorphous material within the temperature range to precipitate hexagonal ferrite magnetic particles; and
   collecting the hexagonal ferrite magnetic particles precipitated;
   wherein the starting material mixture comprises a carbon powder.

2. The method of manufacturing a hexagonal ferrite magnetic powder according to claim 1, wherein the starting material mixture comprises $BaCO_3$.

3. The method of manufacturing a hexagonal ferrite magnetic powder according to claim 1, wherein an average plate diameter of the hexagonal ferrite magnetic powder ranges from 15 to 35 nm.

4. The method of manufacturing a hexagonal ferrite magnetic powder according to claim 1, wherein the hexagonal ferrite magnetic powder is a barium ferrite magnetic powder.

* * * * *